United States Patent Office 2,844,571
Patented July 22, 1958

2,844,571
PRODUCTION OF HIGHLY HYDROXYALKYLATED POLYVINYL ALCOHOLS

Aubrey E. Broderick, South Charleston, W. Va., assignor to Union Carbide Corporation, a corporation of New York No Drawing. Application May 9, 1956
Serial No. 583,632

13 Claims. (Cl. 260—91.3)

This invention relates to the production of hydroxyalkylated polyvinyl alcohols, and more especially it concerns the production of novel highly hydroxyalkylated medium and high macromolecular weight polyvinyl alcohols which are soluble in many organic solvents, and particularly in certain water-soluble organic solvents having boiling points in the range from about 56° C. to 105° C. and higher, such as acetone, acetonitrile, dioxane, dimethylformamide, and dimethylacetamide.

The invention has especial utility for the production of these products in a form substantially free from inorganic impurities such as often are present when reacting a polyvinyl alcohol with ethylene oxide in the presence of an alkaline condensation catalyst such as the alkali metal hydroxides and alcoholates.

The hydroxyalkylated polyvinyl alcohols of the invention readily can be incorporated into solutions of various vinyl resins such as the polyvinyl chlorides, the polyacrylonitriles, and copolymers of vinyl chloride or acrylonitrile with the other thereof or with other ethylenically unsaturated compounds such as vinyl acetate and the lower alkyl esters of acrylic and alpha-methacrylic acids, to provide plastic compositions useful for the production of textile filaments and fibers, as coating and impregnating compositions, and for making cast articles.

The hydroalkyl ethers of polyvinyl alcohols forming a part of this invention have especial utility as antistatic agents in the production of static-resistant hydrophobic resin compositions described in the copending application, Serial No. 446,162 of Andrew T. Walter, filed July 27, 1954.

Water-soluble hydroxyethyl ethers of polyvinyl alcohols already have been made by reacting a polyvinyl alcohol with ethylene oxide in the weight ratios of from 1:1 to 1:2, at temperatures around 50° C. to 150° C.; and usually in the presence of a caustic alkali or of a tertiary organic base. Aqueous solutions of these ethers have merit as sizing compositions for natural and artificial fibers and articles made therefrom. The products, however, lack solubility in organic solvents, and particularly in commercially practicable solvents such as acetone, acetonitrile, dioxane, and dimethylformamide which are effective spinning solvents for various spinnable synthetic resins, hence their usefulness is strictly limited to uses where solubility of the product in such organic solvents is not required.

Among the more important objects of the invention are the following: the production in novel manner of novel highly hydroxyalkylated polyvinyl alcohols that are soluble in acetone, acetonitrile, dioxane, dimethylformamide, and various other organic solvents; the production of such hydroxyalkylated polyvinyl alcohols which are also water-soluble by the reaction of a polyvinyl alcohol, or an at least 98% hydrolyzed polyvinyl ester of a lower alkanoic acid, such as polyvinyl acetate or propionate, with an alpha-alkylene oxide having two to three carbon atoms, either in the vapor phase or the liquid phase, under conditions permitting the hydroxyalkylation to be continued to the required degree without the permanent formation of a gel-like mass that would prevent the further uniform hydroxyalkylation necessary for the production of organic solvent soluble products. These and other objects will be evident from the following description.

In accordance with this invention, the organic solvent-soluble products are produced in good yields by a novel process, one preferred modification of which comprises reacting, in the absence of an added catalyst, a polyvinyl alcohol, or an at least 98% hydrolyzed polyvinyl ester of a lower alkanoic acid, with an alpha-alkylene oxide having two to three carbon atoms, in a weight ratio within the range between about 4.5 and about 13 or more parts of the alkylene oxide per part of the polyvinyl alcohol. This uncatalyzed reaction is conducted at temperatures within the range between about 80° C. and 150° C. in a fluid tight container under the autogenous pressures thereby developed, although higher or lower pressures can be used. The reaction preferably is conducted while the reactants are dispersed in an organic liquid which is a solvent for the resultant hydroxyalkyl ether or polyvinyl alcohol. Desirably, such liquid is a volatile organic solvent having a boiling point around 100° C. or below at atmospheric pressure, such as acetone, acetonitrile and dioxane which readily can be separated from the hydroxyalkyl polyvinyl alcohol product. However, higher boiling dispersing liquids such as dimethylformamide and dimethylacetamide can be used in instances where it may be desirable to retain some of said dispersant in the product to modify the physical properties of the latter and adapt it for particular services as, for example, an antistatic component of a spinnable polyacrylonitrile solution in dimethylformamide. These products are soluble in dioxane, dimethylformamide, acetonitrile and acetone.

In another preferred modification of the invention for the production of such organic solvent-soluble hydroxyalkyl polyvinyl alcohols of relatively high specific viscosities, the polyvinyl alcohol, or the aforesaid equivalent, is reacted with the alpha-alkylene oxide in the stated weight ratio range, in the presence of from about 0.5% to about 4.5%, based upon the weight of the product, of a tertiary amine, preferably a tertiary lower alkyl amine, such as trimethyl amine, triethyl amine and the like, although other tertiary amines such as triphenyl amine and pyridine also are effective. When employing such an amine catalyst, the reaction is conducted at temperatures within the range of between about 50° C. and about 80° C., in a fluid tight reactor under the autogenous pressures developed, or under higher or lower pressures, while the reactants are dispersed in an organic liquid which is a solvent for the resultant hydroxyalkyl ether of polyvinyl alcohol, and preferably acetonitrile, dioxane, or dimethylformamide. Acetone also may be employed somewhat less advantageously in this form of the invention.

In accordance with one important modification of the invention for the production of water-soluble hydroxyethyl polyvinyl alcohols which are soluble in acetone, acetonitrile and dioxane, the polyvinyl alcohol, or an at least 98% hydrolyzed polyvinyl ester of a lower alkanoic acid, such as a polyvinyl acetate or propionate, is reacted with ethylene oxide in the weight ratio of from about 4.5 to 13 or more parts of ethylene oxide per part of the polyvinyl alcohol, alone or dispersed in an organic liquid which becomes a solvent for the hydroxyalkylated product as it is formed—e. g.—dioxane, acetone, acetonitrile, dimethylformamide, the lower dialkyl ethers of ethylene glycol, and mixtures thereof. When the hydroxyethylated product made by this modification of the process using a tertiary amine is required to be completely acetone soluble, the ethylene oxide and polyvinyl alcohol preferably are reacted in the weight ratios of around 6 to 13 or more parts of the ethylene oxide per part of the polyvinyl alcohol.

When substituting propylene oxide in the process for ethylene oxide, those products made by reacting the propylene oxide and polyvinyl alcohol in weight ratios between 4.5 to 1 and 10:1, while being soluble in acetone, acetonitrile and dioxane, are generally insoluble in water.

The condensation reaction, when conducted in the absence of an added catalyst, employs temperatures within the range between about 80° C. and about 150° C., under superatmospheric pressures ranging from 100 to 250 p. s. i., preferably those corresponding to the autogenous pressures produced when conducting the reaction in a fluid tight container. Preferably temperatures between around 80° C. and around 130° C. are used when ethylene oxide is the hydroxyalkylating agent, and between 100° C. and 150° C. when propylene oxide is used. On the other hand, when conducting the condensation reaction in the presence of a catalytic amount of a tertiary amine, as herein described, it is preferred to maintain the reaction temperature at around 50° C. to around 60° C.

The initial mixture of reactants consists of a slurry of polyvinyl alcohol and the alkylene oxide. When no organic solvent is present during the reaction, the final product is a homogeneous viscous liquid, whereas when an inert reaction medium such as acetonitrile is present, a homogeneous solution of the product in such medium is secured. Very small amounts of water in the reactants can be tolerated.

The hydroxyalkylated polyvinyl alcohols of high average molecular weights of this invention are soluble in many organic solvents, such as acetone, methyl isobutyl ketone, and other aliphatic ketones having up to five carbon atoms, dioxane, acetonitrile, dimethylformamide, dimethylacetamide and the lower alkyl diethers of ethylene glycol and of diethylene glycol such as the dimethyl and diethyl ethers of such glycols.

The ratio of alkylene oxide to polyvinyl alcohol, by weight, required to produce hydroxyalkyl polyvinyl alcohols soluble in these organic solvents increases somewhat with the average molecular weight of the polyvinyl alcohol starting material. There appears to be no upper limit to the ethylene oxide content of these products at which their solubility in dioxane and in acetone are lost.

The organic solvent soluble hydroxyalkyl polyvinyl alcohols of the invention are substantially free from ash-forming impurities, and usually have average molecular weights such that the viscosity of a 0.2% solution thereof in water at 20° C. is within the range from about 0.02 to about 0.4.

It generally is preferred to use as starting material the polyvinyl ester of a lower alkanoic acid such as polyvinyl acetate. This ester is dissolved in methanol and alcoholized by slowly mixing with a diluted solution of an alkali metal hydroxide such as potassium hydroxide in methanol and methyl acetate. The polyvinyl alcohol is filtered and washed briefly with methanol to remove the alkali metal hydroxide. The methanol and methyl acetate then are removed by distillation under vacuum.

Polyvinyl alcohols of medium and those of high average molecular weights are especially useful in the process. Examples thereof are polyvinyl alcohols having molecular weights such that 4% solutions thereof in water at 20° C. have absolute viscosities within the range between 4 and 45 centipoises, and even higher.

The average molecular weight of polyvinyl acetate, grade AYAX, mentioned in certain examples, is such that a solution of 8.602 grams thereof in 100 cc. of benzene has an absolute viscosity at 20° C. of 30 centipoises. A 20% solution thereof in acetone has a Ford cup viscosity at 25° C. of 52 to 62 seconds, using a #4 tip.

The specific viscosities of the hydroxyalkyl polyvinyl alcohols referred to herein are determined at 20° C., using an Oswald viscosimeter, in accordance with the formula:

$$\text{Sp. vis.} = \frac{\text{Viscosity of a solution of 0.2 gram of the product in 50 cc. of the solvent}}{\text{Viscosity of the solvent}} - 1$$

The following examples serve to illustrate the invention:

Example 1

300 grams of polyvinyl acetate, grade AYAX (equivalent to 153.5 grams of polyvinyl alcohol), was alcoholized in 1854 grams of methanol and 7 grams of caustic potash at about 40° C. The white precipitate of polyvinyl alcohol was filtered and washed with methanol. The filter cake was substantially free from ash. Upon drying at 105° C., it had a total solids content of 39.75%.

63 grams of the aforesaid polyvinyl alcohol wet with methanol (equivalent to 25 grams of polyvinyl alcohol) was placed in an Adkins bomb, which was then evacuated at 2 mm. of mercury and 20°–30° C. to remove the methanol. Then the lower portion of the bomb was cooled in an acetone-Dry Ice slurry and 345.9 grams of anhydrous ethylene oxide were introduced. The remaining vacuum was broken with nitrogen and the bomb was heated with agitation at from 26° C. to 60° C. during 35 minutes, reaching a pressure of 75 p. s. i. Heating was stopped but the temperature rose to a maximum of 127° C. and 320 p. s. i. pressure in 4.5 hours with only moderate external heating after the first ten minutes.

The contents of the bomb were stripped by distillation to a liquid temperature of 51° C. and 2 mm. of mercury pressure for 4.25 hours, thereby recovering 30.3 grams of ethylene oxide. The residual hydroxyethyl polyvinyl alcohol was in the form of a viscous dark colored liquid which set to a semi-solid form at room temperature. The bomb was rinsed with acetone and the product therein recovered as an acetone solution. The total yield of the hydroxyethyl polyvinyl alcohol, which was ash-free, was 338.3 grams. It was completely soluble in acetone, acetonitrile, dioxane and water.

Measured at 20° C., 0.2% solutions of this product (after drying at 64° C.–65° C.) had the following specific viscosities:

| Solvent | Specific Viscosity |
| --- | --- |
| water | 0.074 |
| acetonitrile | 0.049 |

The product contained ethylene oxide and polyvinyl alcohol equivalents in the weight ratio of 12.6:1. The hydroxyl content of the product was 3.7%, compared with the theoretical 38.7% for the original polyvinyl alcohol.

Example 2

Following the procedure described in Example 1, 63 grams of the ash-free polyvinyl alcohol wet with methanol (corresponding to 25 grams of polyvinyl alcohol dried at 105° C.) was evacuated and 2 mm. of mercury pressure and 20° C.–30° C. overnight to remove the methanol. The dried material was charged to an evacuated Adkins bomb with 275.5 grams of 99.8% ethylene oxide, the vacuum therein broken with nitrogen, and the bomb was agitated and heated from 25° C. to 77° C. in 37 minutes, developing a pressure of 130 p. s. i. At a slower heating rate a temperature of 115° C. and and a pressure of 260 p. s. i. were reached after another 2.3 hours. After a brief cooling step the bomb and contents were heated during about 3.2 hours to a temperature of 100° C. and a pressure up to 100 p. s. i., and then were cooled rapidly to 44° C. and 24 p. s. i. The contents of the bomb were stripped by distillation to a liquid temperature of 50° C. under a pressure of 2 mm. of mercury, recovering 28 grams of ethylene oxide.

The residual product, hydroxyethyl polyvinyl alcohol, in the form of a dark, very viscous liquid, when warm, was removed from the bomb, the last traces being removed by rinsing the bomb with acetone.

The hydroxyethyl polyvinyl alcohol product was a semi-solid plastic at room temperature. It contained ethylene oxide and polyvinyl alcohol equivalents in the weight ratio of about 9.1:1, and was completely soluble in acetone, acetonitrile, water and dioxane.

The specific viscosities of 0.2% solutions of a sample of the product, after drying at 64° C.–65° C., measured at 20° C., were as follows:

| Solvent | Specific Viscosity |
| --- | --- |
| water | 0.055 |
| acetonitrile | 0.050 |

Example 3

After charging to an Adkins bomb 61.5 grams of a mixture of polyvinyl alcohol and methanol, prepared in the manner described in Example 1 from polyvinyl acetate, grade AYAX (equivalent to 21.6 grams of polyvinyl alcohol), the methanol was removed by vacuum distillation, in the manner described in Example 1. Then the liquid was cooled to around −30° C. and 255.8 grams of ethylene oxide were added, followed by 281.5 grams of anhydrous acetone. The residual vacuum was broken with nitrogen and, with agitation, the bomb was heated during 42 minutes to 80° C., and then more slowly during about 2 hours to a maximum temperature of 127° C. and a maximum pressure of 80 p. s. i. After heating at this temperature for 7.5 hours longer the bomb and contents were cooled and the liquid stripped by distillation to a liquid temperature of 47° C. under a pressure of 1 mm. of mercury, recovering 26.5 grams of unreacted ethylene oxide. The residual hydroxyethyl polyvinyl alcohol in acetone was rinsed from the bomb with additional acetone, and gave a total yield corresponding to 220.5 grams of the hydroxyethyl polyvinyl alcohol (dried at 64° C.–65° C.), equivalent to 79.5%, based upon the combined weights of the ethylene oxide and the polyvinyl alcohol; and at an efficiency of 89%.

A sample of the product, dried at 65° C., was completely soluble in acetone, acetonitrile, dioxane and water.

The specific viscosities of 0.2% solutions in certain solvents of the thus dried product, measured at 20° C., are as follows:

| Solvent | Specific Viscosity |
| --- | --- |
| water | 0.111 |
| acetonitrile | 0.058 |

The hydroxyethyl polyvinyl alcohol contained ethylene oxide and polyvinyl alcohol equivalents in the weight ratio of about 10.6:1.

Example 4

An Adkins type bomb was charged with 61.3 grams of a mixture of polyvinyl alcohol and methanol, prepared in the manner described in Example 1 from polyvinyl acetate, grade AYAX, and equivalent to 25.2 grams of polyvinyl alcohol dried at 105° C. The bomb and contents were heated under vacuum to remove the methanol in manner as described in Example 1. After cooling the bomb contents to about −30° C., 276.2 grams of ethylene oxide were mixed therewith, followed by 256.9 grams of anhydrous acetonitrile. The bomb and contents were agitated while being heated during about 3 hours to a temperature of 118° C. and to a pressure of 120 p. s. i. Then a maximum temperature of 128° C. was reached during 4.3 hours while the pressure fell off. The contents of the bomb were stripped by distillation to a liquid temperature of 49° C. under a pressure of 1–2 mm. of mercury, thereby recovering 7.3 grams of ethylene oxide.

The bomb residue was a homogeneous dark red viscous solution of hydroxyethyl polyvinyl alcohol in acetonitrile. A total yield corresponding to 212 grams of this product dried to constant weight at 64° C.–65° C. was secured, corresponding to a yield of 70.4% and an efficiency of 72.9%.

The thus dried product, which contained ethylene oxide and polyvinyl alcohol equivalents in the weight ratio of 10.6:1, was completely soluble in acetone, acetonitrile, dioxane and water. 0.2% solutions of the thus dried product have the following specific viscosities at 20° C.:

| Solvent | Specific Viscosity |
| --- | --- |
| water | 0.114 |
| acetonitrile | 0.039 |

Example 5

Following the general procedure described in Example 1, a mixture of polyvinyl alcohol and methanol was made by the alcoholysis of polyvinyl acetate, grade AYAX. An Adkins bomb was charged with 61.1 grams of this mixture, corresponding to 25.16 grams of polyvinyl alcohol, dried to constant weight at 105° C. The bomb and contents were cooled to about −30° C. and there were added 398.5 grams of propylene oxide, and thereafter 425.1 grams of acetonitrile. The bomb was agitated and heated during 5.25 hours to a temperature of 128° C. and a maximum pressure of 93 p. s. i. After cooling to room temperature it was heated during about 25 hours to a maximum temperature of 148° C. and a maximum pressure of 100 p. s. i.

The reaction mixture was stripped by distillation to a liquid temperature of 49° C. under a pressure of 1 mm. of mercury, yielding 160.2 grams of unreacted propylene oxide.

The dark viscous solution of hydroxypropyl polyvinyl alcohol in acetonitrile was secured in a yield corresponding to 242.7 grams (after heating to constant weight at 64° C.–65° C.).

The said product, dried to constant weight at 64° C.–65° C., which contained propylene oxide and polyvinyl alcohol equivalents in the weight ratio of about 9.5:1, was soluble in acetone, acetonitrile and dioxane, but was insoluble in water.

A 0.2% solution of the dried product in acetonitrile had a specific viscosity at 20° C. of 0.042.

Example 6

Following the general procedure described in Example 3, excepting that a lower average and maximum temperature was used and a lower ratio of ethylene oxide to polyvinyl alcohol was employed, a polyvinyl alcohol-methanol mixture was prepared from polyvinyl acetate, grade AYAX, by dissolving 100 grams of the latter in methanol, mixing the solution with a solution of 2.5 grams of potassium hydroxide in methanol at about 40° C., filtering off the polyvinyl alcohol, and washing the latter with methanol until substantially free from ash-yielding impurities.

Seventy grams of the polyvinyl alcohol-methanol mixture (equivalent to 25.1 grams of polyvinyl alcohol, dried at 105° C.) was charged to an Adkins bomb and heated under vacuum to remove the methanol, as described in Example 1. After cooling the bomb contents to about −30° C., 155.6 grams of ethylene oxide were mixed therewith, followed by 181.6 grams of dry acetone. The bomb and contents were agitated and rapidly heated during 1.25 hours to a temperature of 83.5° C., developing a pressure of 55 p. s. i. The heating rate then was reduced and during 6.5 hours a temperature of 94° C. and a pressure of 72 p. s. i. were attained. Heating was continued for 23 hours at 80° to 92.5° C., attaining a final pressure of 34 p. s. i. at 92.5° C. The reaction mixture was stripped by distillation to a liquid temperature of 67° C. under a pressure of 2 mm. of mercury, thus removing and recovering 35.5 grams of ethylene oxide.

The residual hydroxyethyl polyvinyl alcohol, upon drying to constant weight at 65° C., was recovered as 140 grams of a dark red viscous liquid, corresponding to a yield of 79.6% and an efficiency of 97%. This product was soluble in acetone, acetonitrile, dioxane and water, respectively. It contained ethylene oxide and polyvinyl alcohol equivalents in the weight ratio of about 4.8:1.

The specific viscosities of 0.2% solutions of the product, dried to constant weight at 64° C., were as follows, at 20° C.:

| Solvent | Specific Viscosity |
|---|---|
| water | 0.147 |
| acetonitrile | 0.073 |

*Example 7*

To an Adkins rocking bomb was charged 28.14 grams of dry polyvinyl alcohol, derived from grade AYAX polyvinyl acetate, admixed with 41.86 grams of methanol. After removing the methanol under vacuum at 20° C.–30° C., there were added 275.1 grams of ethylene oxide, 2.7 grams of trimethylamine and 350.4 grams of dimethylformamide. The mixture of reactants and bomb were agitated for 65 minutes at 60° C. and then were held for 25.5 hours at between 60° C. and 72° C. The bomb and contents were cooled and then stripped of unreacted ethylene oxide at 20° C.–30° C. under one millimeter of mercury pressure. The residual dimethylformamide solution of the hydroxyethyl polyvinyl alcohol, upon drying at 20° C.–30° C. under one millimeter of mercury, yielded an amber colored plastic gel which readily could be dissolved in acetone, acetonitrile, dimethylformamide and water. It contained ethylene oxide and polyvinyl alcohol residues in the weight ratio of 9.77:1. A yield of substantially 100% was secured. Solutions were prepared for viscosity measurements by diluting portions of the dimethylformamide solution of the product with the following solvents to a solids content of 0.2%. The following specific viscosity data were secured:

| Solvent | Specific Viscosity at 20° C. |
|---|---|
| Water | 0.178 |
| Acetonitrile | 0.195 |
| Acetone | 0.060 |
| Dimethylformamide | 0.428 |

*Example 8*

Following the procedure and using the apparatus mentioned in Example 7, the following mixture of reactants was introduced into the Adkins bomb: 70 grams of the methanol-wet, polyvinyl alcohol described in Example 7; 278 grams ethylene oxide; 3.2 grams of trimethylamine, and 350.1 grams of dry acetonitrile. The mixture of reactants was heated to about 50° C. in 70 minutes, and was then heated for 27 hours at temperatures within the range from around 45 to 53° C., and pressures ranging from 16 p. s. i. to 13 inches of vacuum. The bomb was then cooled and the reaction mixture was vacuum stripped to remove 1.29 grams of unreacted ethylene oxide. The residual acetonitrile solution of the reaction product was extremely viscous, and was filtered under pressure. The filtered solution contained 305.7 grams of hydroethyl polyvinyl alcohol and, upon drying the acetonitrile solution at 20–30° C. and 1 millimeter pressure, an amber-colored viscous gel was secured which readily dissolved in acetonitrile, acetone, dimethylformamide and water. It contained ethylene oxide and polyvinyl alcohol residues in the weight ratio of 9.8 to 1 respectively.

Solutions for viscosity measurements were prepared by diluting portions of the product with each of the above mentioned solvents, respectively, to a concentration of 0.2% of solids. The following specific viscosity data were found:

| Solvent | Specific Viscosity |
|---|---|
| Water | 0.372 |
| Acetonitrile | 0.195 |
| Acetone | 0.161 |
| Dimethylformamide | 0.691 |

*Example 9*

125 grams of methanol-wet polyvinyl alcohol (equivalent to 50.16 grams of polyvinyl alcohol, bone-dry basis) prepared from a commercial polyvinyl acetate, AYAX grade by alcoholysis with methanol and KOH, after removal of all methanol under vacuum, had added thereto 250.3 grams of 99.45% ethylene oxide, 0.8 gram of trimethylamine and 550.9 grams of acetonitrile containing 0.08% of water. With agitation, the reaction mixture was heated to 60° C. in an hour, and the heating was continued for 52 hours at 58° C.–61° C. under autogenous pressures. Thereafter, the reaction mixture was cooled and evacuated at room temperature under 1–2 millimeter pressure to recover 0.82 gram of unreacted ethylene oxide. The residual hydroxyethyl polyvinyl alcohol consisted of 283.65 grams of acetonitrile soluble hydroxyethyl polyvinyl alcohol and 3.6 grams of a product insoluble in acetonitrile. Upon separating and drying the soluble portion of the reaction product, it formed an elastic plastic film which readily could be dissolved in water, acetonitrile, and dimethylformamide, but was only partly soluble in acetone. Specific viscosity determinations were made on the soluble portion of the product by preparing solutions for measurement by dilution of portions of the 21.85% acetonitrile solution to 0.2% solids with water, acetonitrile, acetone, and dimethylformamide, respectively. The following viscosity data were secured:

| Solvent | Specific Viscosity at 20° C. | |
|---|---|---|
| Water | 0.293 | Clear solution. |
| Acetonitrile | 0.143 | Do. |
| Acetone | 0.046 | Partly insoluble. |
| Dimethylformamide | 0.374 | Clear solution. |

The over-all weight ratio of ethylene oxide to polyvinyl alcohol in the combined product was 5:1.

*Example 10*

64.2 grams of methanol-wet polyvinyl alcohol (corresponding to 25 grams of polyvinyl alcohol, dry basis), prepared from AYAX grade polyvinyl acetate, was evacuated at 20°–30° C. to remove the methanol. Then 2.5 grams of triethylamine, 300.6 grams of bone-dry acetonitrile, and 273.5 grams of ethylene oxide were added and the mixture heated with agitation to 58° C. in one hour and thereafter heated for 30.5 hours longer at 60°–62° C. The contents of the bomb were cooled and thereafter stripped of 20.2 grams of unreacted ethylene oxide under vacuum. The residual product was recovered as a dark viscous acetonitrile solution containing 38% of hydroxyethyl polyvinyl alcohol, equivalent to a yield of 87.7% of theory, at a calculated efficiency of 94.3%. The overall weight ratio of ethylene oxide to polyvinyl alcohol in the product was 10.15:1. The product, upon drying at 50° C. in air, was soluble in acetone, acetonitrile, water and dioxane. 0.2% solutions thereof in water, acetonitrile and acetone, respectively, had specific viscosities, at 20° C., of 0.208, 0.168 and 0.196.

This application is a continuation-in-part of my co-pending application, Serial 403,457, filed January 11, 1954.

The invention is susceptible of modification within the scope of the appended claims.

I claim:

1. As new products, hydroxyalkyl ethers of polyvinyl alcohols selected from the class consisting of the hydroxyethyl and hydroxypropyl ethers of polyvinyl alcohols, which ethers contain at least about 4.5 parts by weight of hydroxyalkyl residues per part by weight of polyvinyl alcohol residues and are soluble in acetonitrile and in dioxane.

2. As new products, hydroxyalkyl ethers of polyvinyl alcohols selected from the class consisting of the hydroxyethyl and hydroxypropyl ethers of polyvinyl alcohols, which ethers are soluble in acetonitrile and in dioxane, and are substantially free from ash-forming impurities as formed, and contain at least about 4.5 parts by weight of hydroxyalkyl residues per part by weight of polyvinyl alcohol residues.

3. As new products, acetonitrile-soluble, water-insoluble hydroxypropyl ethers of polyvinyl alcohols containing propylene oxide and polyvinyl alcohol equivalents in a weight ratio within the range from about 4.5 to 1 to about 10:1, and being substantially free from ash-forming impurities as formed.

4. As new products, hydroxyethyl ethers of polyvinyl alcohols which contain at least about 6 parts by weight of hydroxyethyl residues per part by weight of polyvinyl alcohol residues, and are soluble in acetonitrile and in acetone.

5. As new products, hydroxyethyl ethers of polyvinyl alcohols, said ethers containing at least about 4.5 parts by weight of hydroxyethyl residues per part by weight of polyvinyl alcohol residues and being completely soluble in water, in acetonitrile and in dioxane, and being substantially free from ash-forming impurities as formed.

6. Process for making dioxane-soluble hydroxyalkyl ethers of polyvinyl alcohols selected from the class consisting of the hydroxyethyl and the hydroxypropyl ethers of polyvinyl alcohols which comprises reacting at temperatures ranging between about 50° C. and about 150° C. an alpha-alkylene oxide having two to three carbon atoms with a polyvinyl alcohol in the ratio of at least 4.5 parts of the alkylene oxide per part of the polyvinyl alcohol, all parts being by weight.

7. Process for making dioxane-soluble hydroxyalkyl ethers of polyvinyl alcohols, selected from the class consisting of the hydroxyethyl and the hydroxypropyl ethers of polyvinyl alcohols, which comprises reacting at temperatures ranging between about 80° C. and about 150° C. an alpha-alkylene oxide having two to three carbon atoms with a polyvinyl alcohol in the ratio of from 4.5 to about 13 parts of the alkylene oxide per part of the polyvinyl alcohol, all parts being by weight, in the absence of an added catalyst.

8. Process for making dioxane-soluble hydroxyalkyl ethers of polyvinyl alcohols, selected from the class consisting of the hydroxyethyl and the hydroxypropyl ethers of polyvinyl alcohols, which comprises reacting at temperatures ranging between about 80° C. and about 150° C. an alpha-alkylene oxide having two to three carbon atoms with a polyvinyl alcohol in the ratio of from 4.5 to about 13 parts of the alkylene oxide per part of the polyvinyl alcohol, all parts being by weight, while dispersed in an organic liquid which is a solvent for the resultant hydroxyalkyl ether of polyvinyl alcohol, said reaction being conducted in the absence of an added catalyst.

9. Process for making dioxane-soluble hydroxyalkyl ethers of polyvinyl alcohols, selected from the class consisting of the hydroxyethyl and the hydroxypropyl ethers of polyvinyl alcohols, which comprises reacting at temperatures ranging between about 80° C. and about 150° C. an alpha-alkylene oxide having two to three carbon atoms with a polyvinyl alcohol in the ratio of from 4.5 to about 13 parts of the alkylene oxide per part of the polyvinyl alcohol, all parts being by weight, while dispersed in a volatile organic solvent having a boiling point below 100° C. at atmospheric pressure and which is a solvent for the resultant hydroxyalkyl ether of polyvinyl alcohol, said reaction being conducted in the absence of an added catalyst.

10. Process for making dioxane-soluble hydroxyalkyl ethers of polyvinyl alcohols, selected from the class consisting of the hydroxyethyl and the hydroxypropyl ethers of polyvinyl alcohols, which comprises reacting at temperatures ranging between about 80° C. and about 150° C. an alpha-alkylene oxide having two to three carbon atoms with a polyvinyl alcohol in the ratio of from 4.5 to about 13 parts of the alkylene oxide per part of the polyvinyl alcohol, all parts being by weight, while dispersed in acetone, the said reaction being conducted in the absence of an added catalyst.

11. Process for making dioxane-soluble hydroxyalkyl ethers of polyvinyl alcohols, selected from the class consisting of the hydroxyethyl and the hydroxypropyl ethers of polyvinyl alcohols, which comprises reacting at temperatures ranging between about 80° C. and about 150° C. an alpha-alkylene oxide having two to three carbon atoms with a polyvinyl alcohol in the ratio of from 4.5 to about 13 parts of the alkylene oxide per part of the polyvinyl alcohol, all parts being by weight, while dispersed in acetonitrile, the said reaction being conducted in the absence of an added catalyst.

12. Process for making acetonitrile-soluble hydroxyalkyl ethers of polyvinyl alcohols, selected from the class consisting of the hydroxyethyl and the hydroxypropyl ethers of polyvinyl alcohols, which comprises reacting at temperatures ranging between about 50° C. and about 80° C. an alpha-alkylene oxide having 2 to 3 carbon atoms with a polyvinyl alcohol in the ratio of from about 4.5 to about 13 parts of the alkylene oxide per part of the polyvinyl alcohol, all parts being by weight, in the presence of a solvent for the resultant hydroxyalkyl ethers of polyvinyl alcohols, which solvent is selected from the class consisting of acetone, acetonitrile, dimethylformamide, and dimethylacetamide, in the presence of a tertiary amine catalyst.

13. Process for making acetone-soluble hydroxyalkyl ethers of polyvinyl alcohols, selected from the class consisting of the hydroxyethyl and the hydroxypropyl ethers of polyvinyl alcohols, which comprises reacting at temperatures ranging between about 50° C. and about 80° C. an alpha-alkylene oxide having 2 to 3 carbon atoms with a polyvinyl alcohol in the ratio of at least six parts of the alkylene oxide per part of the polyvinyl alcohol, all parts by weight, in the presence of a solvent for the resultant hydroxyalkyl ethers of polyvinyl alcohols, which solvent is selected from the class consisting of acetone, acetonitrile, dimethylformamide, and dimethylacetamide, in the presence of a tertiary amine catalyst.

References Cited in the file of this patent

UNITED STATES PATENTS

| | | |
|---|---|---|
| 1,971,662 | Schmidt et al. | Aug. 28, 1934 |
| 2,104,000 | Reppe et al. | Dec. 28, 1937 |

FOREIGN PATENTS

| | | |
|---|---|---|
| 364,323 | Great Britain | Jan. 7, 1932 |
| 575,141 | Germany | Apr. 25, 1933 |